US008576071B2

(12) United States Patent
Lo et al.

(10) Patent No.: US 8,576,071 B2
(45) Date of Patent: Nov. 5, 2013

(54) AUTOMATIC LOCK AND AUTOMATIC UNLOCK METHOD FOR COMPUTER SYSTEM AND COMPUTER SYSTEM THEREOF

(75) Inventors: Yung-Chih Lo, Hsinchu Hsien (TW); Feng-Jian Chou, Hsinchu Hsien (TW); Chih-Yuan Hsieh, Hsinchu Hsien (TW); Wei Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 592 days.

(21) Appl. No.: 12/636,937

(22) Filed: Dec. 14, 2009

(65) Prior Publication Data

US 2010/0164740 A1 Jul. 1, 2010

(30) Foreign Application Priority Data

Dec. 30, 2008 (TW) ................................ 97151459 A

(51) Int. Cl.
*G08B 21/00* (2006.01)

(52) U.S. Cl.
USPC .......... 340/540; 340/5.2; 340/5.31; 340/5.52; 340/5.8; 340/5.81; 340/5.82; 340/5.83; 340/686.1; 700/13; 713/186; 713/323; 726/17; 726/34

(58) Field of Classification Search
USPC ............. 340/540, 539.1, 5.2, 5.31, 5.52, 5.8, 340/5.81, 5.82, 5.83, 686.1; 700/13; 707/104.1; 713/200–202, 186, 323; 726/17, 34
See application file for complete search history.

(56) References Cited

U.S. PATENT DOCUMENTS 5,821,854 A * 10/1998 Dorinski et al. ......... 340/539.21
5,959,530 A * 9/1999 Lupien et al. ............. 340/568.1
6,070,240 A * 5/2000 Xydis ............................ 726/17
6,189,105 B1 * 2/2001 Lopes ............................ 726/20
6,560,711 B1 * 5/2003 Given et al. ..................... 726/34
2002/0095222 A1 * 7/2002 Lignoul .......................... 700/13
2011/0018911 A1 * 1/2011 Kitaoka et al. ................ 345/690

FOREIGN PATENT DOCUMENTS

CN 1873577 A 12/2006
CN 101154254 A 4/2008

OTHER PUBLICATIONS

Chinese Patent Office, Office Action 0910027CN, Mar. 9, 2011, pp. 1-9.

* cited by examiner

*Primary Examiner* — Brent Swarthout
(74) *Attorney, Agent, or Firm* — Edell, Shapiro & Finnan, LLC

(57) ABSTRACT

An automatic lock and automatic unlock method for a computer system and the associated computer system are provided. The method includes steps of detecting whether a user is in a predetermined range when a computer system is in an unlock status and recording a duration during which the user is not in the predetermined range, controlling the computer system to enter a lock status when the duration is greater than a predetermined time, determining whether the user has an effective authority when the computer system is in the lock status and the user is detected in the predetermined range, and controlling the computer system to enter the unlock status when the user has the effective authority.

11 Claims, 3 Drawing Sheets

R1
30
3
320
32
U1

AUTOMATIC LOCK AND AUTOMATIC UNLOCK METHOD FOR COMPUTER SYSTEM AND COMPUTER SYSTEM THEREOF

CROSS REFERENCE TO RELATED PATENT APPLICATION

This patent application is based on Taiwan, R.O.C. patent application No. 97151459 filed on Dec. 30, 2008.

FIELD OF THE INVENTION

The present invention relates to a lock and unlock method for a computer system and a computer system thereof, and more particularly, to an automatic lock and automatic unlock method for a computer system and a computer system thereof.

BACKGROUND OF THE INVENTION

At present, when a computer does not receive any command for a duration greater than a predetermined time value, the computer enters a lock status. For example, when a user does not press any button on the keyboard, or does not move the mouse or click any buttons of the mouse, the computer starts a screen protection program or prohibits access to the computer. In addition to extending the lifespan of the screen and achieving an energy saving effect, a data confidentiality function is further achieved. Generally speaking, when the user wishes to unlock the screen, the user needs to enter a password. Therefore, the computer is prevented from being used by other people when the user is not in front of the computer. However, it is not uncommon for users to forget their passwords, resulting in significant frustration. Also, different users have different requirements or preferences for the predetermined time value. That is, when various users share a same computer, a single predetermined time value is rather unsatisfactory for the needs of every user.

When the predetermined time is too short, the user has to enter the password to unlock the screen frequently, which is very inconvenient for the user. On the contrary, when the predetermined time is too long, although the user need not enter the password frequently, the lifespan of the screen is not extended and the computer is not prevented from being arbitrarily used by others either.

Therefore, an automatic lock and automatic unlock method for a computer system is provided according to the present invention. According to the method, whether to automatically lock or automatically unlock the computer is determined with respect to different circumstances, so as to reduce the trouble and inconvenience of the user and solve the foregoing problem.

SUMMARY OF THE INVENTION

One object of the present invention is to provide an automatic lock and automatic unlock method for a computer system. According to the method, whether to lock or unlock the computer system is determined by detecting or identifying a user.

According to an embodiment, the automatic lock and automatic unlock method for a computer system comprises steps of detecting whether a user is in a predetermined range when a computer system is in an unlock status, recording a duration during which the user is not in the predetermined range, controlling the computer system to enter a lock status when the duration is greater than a predetermined time, determining whether the user has an effective authority when the computer system is in the lock status and the user is detected in the predetermined range, and controlling the computer system to enter the unlock status when the user has the effective authority.

Another object of the present invention is to provide an automatic lock and automatic unlock computer system. Whether to lock or unlock the computer system is determined by detecting a user using a detecting module and identifying the user using an identifying module.

According to an embodiment, the computer system comprises a detecting module, an identifying module and a processing unit. The detecting module detects whether a user is in a predetermined range. The identifying module identifies an authority of the user. The processing unit, coupled to the detecting module and the identifying module, controls the detecting module and the identifying module. The processing unit executes a computer program or logic instructions for controlling the computer system to enter an unlock status or a lock status.

When the computer system is in the unlock status and the detecting module does not detect the user in the predetermined range, the processing unit records a duration. When the duration is greater than a predetermined time, the processing unit controls the computer system to enter the lock status. When the computer system is in the lock status and the detecting module detects the user in the predetermined range, the processing unit determines whether the authority of the user is an effective authority. When the processing unit determines the user has the effective authority, the processing unit controls the computer system to enter the unlock status.

In sum, according to the present invention, whether a user is in a predetermined range is detected by a detecting module, and hence whether to lock a computer system is determined according to a duration during which the user is not in front of the computer system. Moreover, according to the present invention, an authority of the user is identified by an identifying module, and consequently whether to unlock the computer system is determined according to the authority of the user. Accordingly, the computer system according to the present invention determines whether to lock and unlock the computer system according to a detection result of the detecting module and an identification result of the identifying module. With respect to different detection and identification results of different circumstances, the computer system according to the present invention generates corresponding responses to achieve automatic lock and automatic unlock capabilities.

The advantages and spirit related to the present invention can be further understood via the following detailed description and drawings.

DETAILED DESCRIPTION OF THE PREFERRED EMBODIMENT

Figure 1:
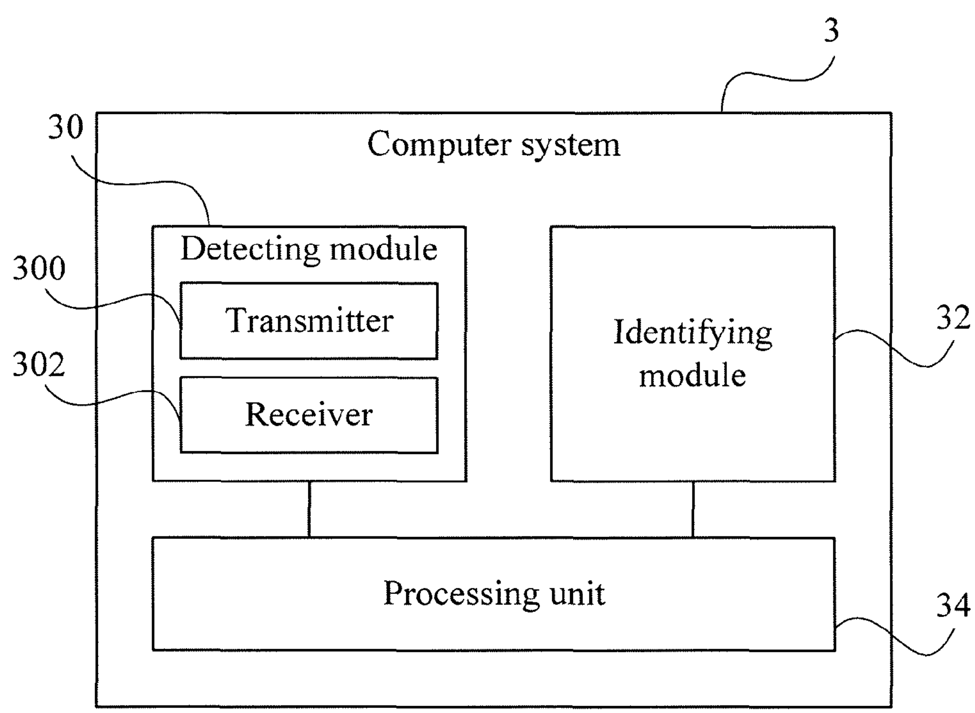
FIG. 1 is a functional block diagram of a computer system in accordance with an embodiment of the present invention.

FIG. 1 shows a functional block diagram of a computer system 3 in accordance with an embodiment of the present invention. The computer system 3 comprises a detecting module 30, an identifying module 32 and a processing unit 34. The processing unit 34, coupled to the detecting module 30 and the identifying module 32, controls the detecting module 30 and the identifying module 32, and executes a computer program or logic instructions for controlling the computer system 3 to enter an unlock status or a lock status.

Figure 2:
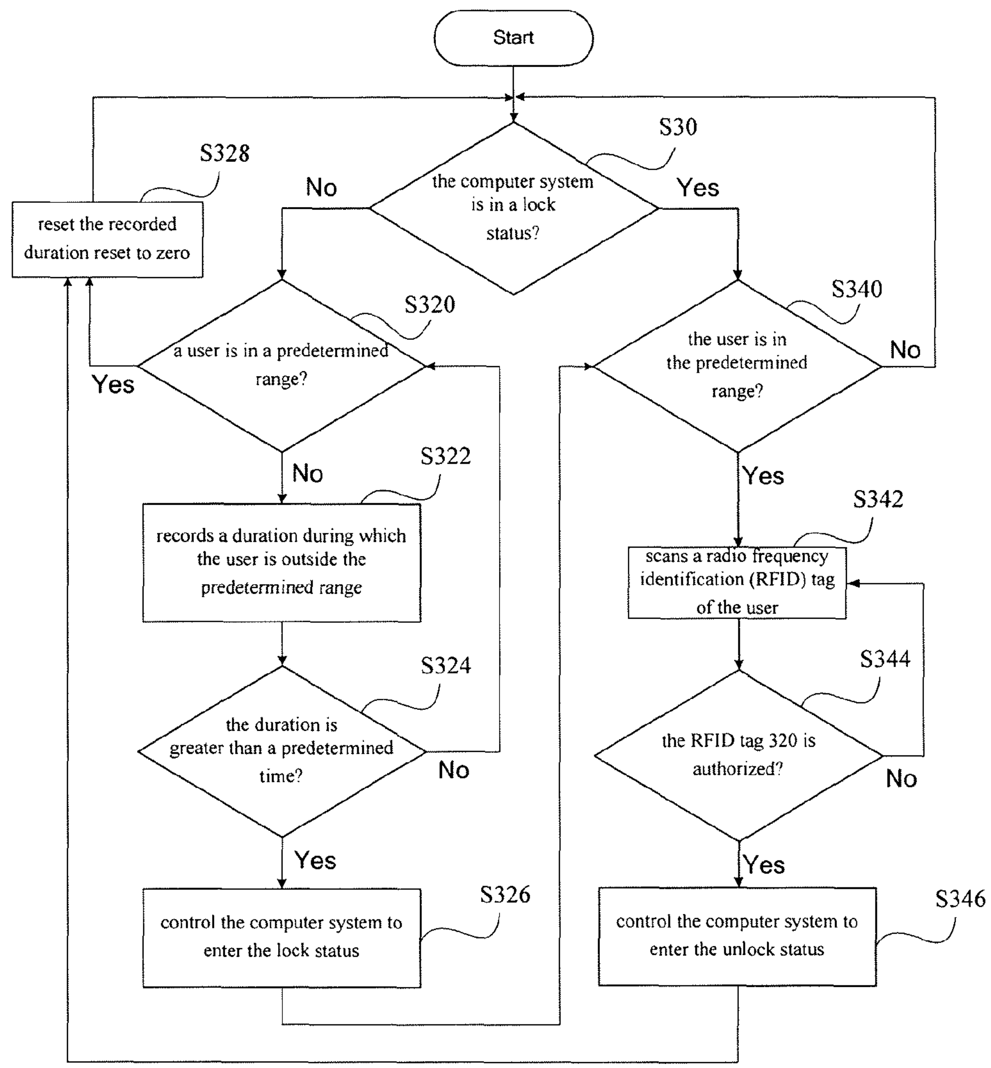
FIG. 2 is a flow chart of an automatic lock and automatic unlock method for a computer system in accordance with an embodiment of the present invention.
Figure 3A:
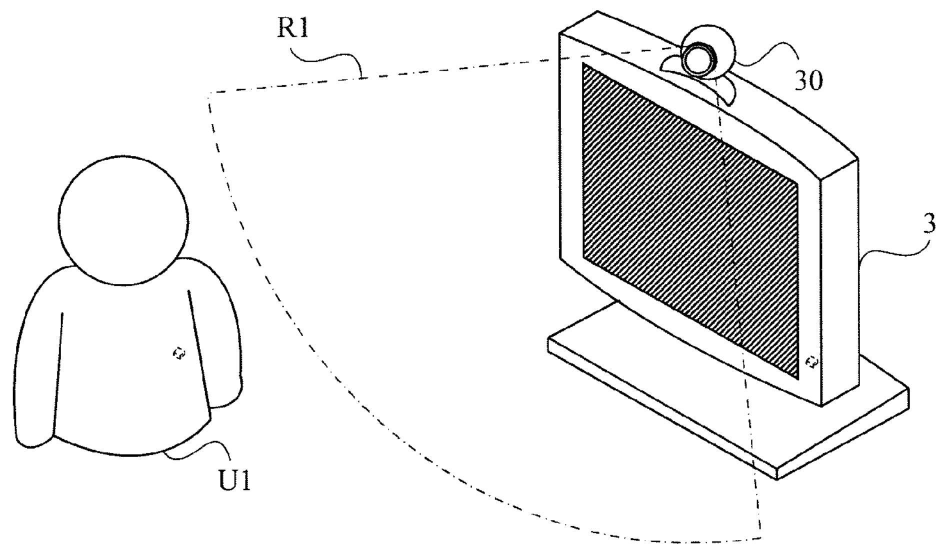
FIG. 3A is a schematic diagram corresponding to Step S320 to Step S326 of FIG. 2.
Figure 3B:
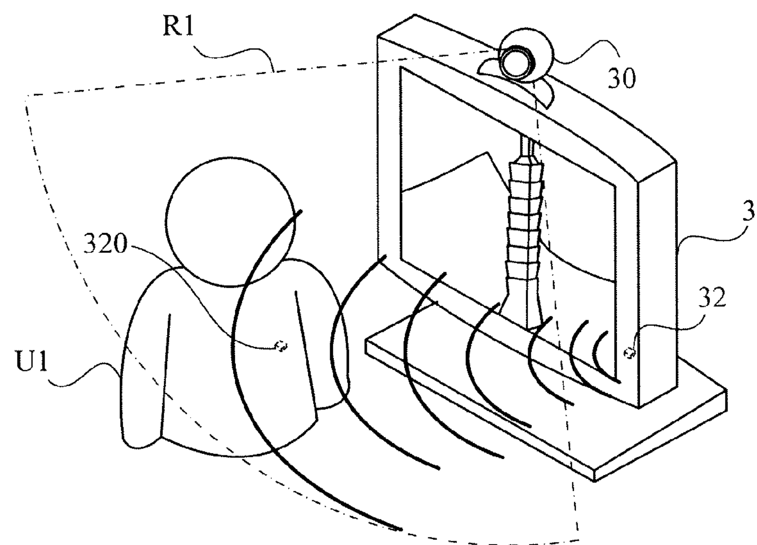
FIG. 3B is a schematic diagram corresponding to Step S340 to Step S346 of FIG. 2.

FIG. 2 shows a flow chart of an automatic lock and automatic unlock method for a computer system in accordance with an embodiment of the present invention. FIG. 3A and FIG. 3B are illustrated to gain a better understanding of the flow chart. FIG. 3A is a schematic diagram corresponding to Step S320 to Step S326 of FIG. 2, and FIG. 3B is a schematic diagram corresponding to Step S340 to Step S346 of FIG. 2.

Referring to FIG. 2, the automatic lock and automatic unlock method for a computer system according to the present invention comprises steps below.

In Step S30, the processing unit 34 determines whether the computer system 3 is in a lock status. For example, the lock status of the computer system 3 is executing a screen protection program and/or prohibiting access to or operations of the computer as shown in FIG. 3A. On the contrary, the unlock status of the computer system 3 is operating the screen in a normal display status and allowing the user to access or operate the computer as shown in FIG. 3B.

When the result from Step S30 is yes, i.e., when the computer system 3 is in the lock status, Step S340 is performed. When the result from Step S30 is no, i.e., when the computer system 3 is in the unlock status, Step S320 is performed.

In Step S320, the processing unit 34 determines whether a user U1 is in a predetermined range R1. Referring to FIG. 3A, the detecting module 30 of the computer system 3 is a visible light image detector (such as a web camera), which is used for capturing visible light images. For example, the visible light image detector receives a detecting wave (visible light) reflected from the user, and an emission source of the detecting wave is a luminary such as the sun or a lamp. The processing unit 34 shown in FIG. 1 then analyzes a skin color (flesh color) extent of a captured image. When the skin color extent of the captured image is great enough, it means that the user U1 is near enough to the web camera. That is, the processing unit 34 determines that the user U1 is located in the predetermined range R1.

In another embodiment, the detecting module 30 of the computer system 3 comprises a transmitter 300 and a receiver 302 as shown in FIG. 1. The detecting module 30 transmits and receives a reflected detecting wave. The detecting module 30 further determines whether a user is in a predetermined range by analyzing the detecting wave using a processing unit. For example, the transmitter 300 transmits an infrared ray, and the receiver 302 receives the infrared ray reflected from an obstacle such as the user. When an intensity of the infrared ray received by the receiver 302 is strong enough (greater than a threshold), it means that the user is near the computer system and the user is in the predetermined range. In addition, the detecting module 30 can be a radio detector or an ultrasonic detector, the principle of which is the same as that of the infrared detector and shall not be further disclosed for brevity.

Since Step 320 is a subsequent step following a negative result from Step 30, when the result from Step 320 is also negative, it means that the computer system 3 is in the unlock status and the user U1 is not in the predetermined range R1. Therefore, when the user U1 is not in the predetermined range R1 for some time, the computer system 3 enters the lock status to prevent arbitrary use of the computer system 3.

Step S322 is performed to comply with the foregoing logic. In Step S322, the processing unit 34 records a duration during which the user U1 is outside the predetermined range R1. For example, the detecting module 30 detects every 0.5 seconds, and the duration is N*0.5 seconds when N times of detection are performed and no user is detected.

In Step S324, the processing unit 34 determines whether the duration is greater than a predetermined time. When the result from Step S324 is no, it means that the duration during which the user U1 is outside the predetermined range R1 is not long enough, so that a subsequent lock operation is not needed and Step S320 is then repeated. Furthermore, assuming the user has returned to the computer, the user is determined as being located in the predetermined range in Step S320, Step S328 is then executed. In Step S328, the recorded duration is reset to zero to avoid accumulating a previous duration to a next duration.

When the result from Step S324 is yes, it means that the duration during which the user U1 is not in the predetermined range R1 is greater than the predetermined time. Step S326 is then executed. In Step S326, a computer program such as a screen protection program is performed to control the computer system 3 to enter the lock status. The computer system 3 is in the lock status at this point, and therefore Step S340 is executed.

In Step S340, the processing unit 34 determines whether the user U1 is in the predetermined range R1. The operation of Step S340 is the same as that of Step S320 and shall not be described for brevity. It is to be noted that, a subsequent flow of Step S340 is different from that of Step S320.

Since Step 340 is a subsequent step following an affirmative result from Step 30, when the result from Step 320 is also affirmative, it means that the computer system 3 is in the lock status and the user U1 is in the predetermined range R1. At this point, the processing unit 34 (shown in FIG. 1) of the computer system 3 determines whether the user U1 has an effective authority. When the user U1 has the effective authority, the computer system 3 enters the unlock status as shown in FIG. 3B so that the user U1 is able to use the computer system 3.

Step S342 is executed to comply with the foregoing logic. Referring to FIG. 3B, the identifying module 32 scans a radio frequency identification (RFID) tag 320 of the user U1.

In Step S344, the processing unit 34 determines whether the RFID tag 320 is authorized. For instance, the identifying module 32 of the computer system 3 is an RFID tag reader for transmitting an electromagnetic wave in a predetermined frequency range. The RFID tag 320 is also carried on the user. When the RFID tag 320 receives the electromagnetic wave in the predetermined frequency range, the RFID tag 320 transmits a unique identification number of the RFID tag 320 in response. Therefore, the processing unit 34 compares the received identification number with an effective identification number list to determine whether the user U1 has the effective authority.

An affirmative result from Step S344 means that the user U1 has the effective authority, and Step S346 is executed. The processing unit 34 controls the computer system 3 to enter the unlock status so that the user U1 is able to use the computer system 3. Since the computer system 3 is in the unlock status and the user U1 is in front of the computer system, the whole situation matches with the affirmative result from Step S320 and an antecedent condition of the negative result from Step S30. Therefore, Step S328 is executed after Step S346. Reference can be made to the abovementioned description for Step S328 and subsequent operations.

It is noted that, according to an embodiment of the present invention, whether the user has the effective authority is determined by accessing the RFID tag. In addition or instead, image identification or fingerprint identification may also be employed according to the present invention using, respectively, an image reader and fingerprint reader. That is, an image or a fingerprint of the user having the authority is recorded in the computer system in advance, and whether a present user is allowed to use the computer system is determined by comparing the image, i.e., image identification, or analyzing the fingerprint, i.e., fingerprint identification.

Moreover, in another embodiment, the detecting module 30 used in Step S320 and Step S340 and the identifying module 32 used in Step S342 are a same object such as an image capturing device. The image capturing device captures an image of a user, and accordingly a processing unit can analyze a skin color extent of the captured image to determine whether the user is in a predetermined range. Similarly, the processing unit can analyze features of the captured image to determine whether the user has an effective authority. Thus, the detecting module may include, for example, a visible light image detector, an infrared detector, a radio detector or an ultrasonic detector.

Compared to the prior art, a detecting module detects whether a user is in a predetermined range according to the present invention, and whether to lock a computer system is further determined according to a duration during which the user is not in front of the computer system. Furthermore, an identifying module identifies an authority of the user according to the present invention, and hence whether to unlock the computer system is determined according to the authority of the user. Therefore, whether to automatically lock or automatically unlock the computer is determined according to a detection result of the detecting module and an identification result of the identifying module according to the present invention. With respect to different detection and identification results of different circumstances, the computer system according to the present invention generates corresponding responses to achieve automatic lock and automatic unlock capabilities.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An automatic lock and automatic unlock method for a computer system, the method comprising steps of:

(a) when the computer system is in an unlock status, detecting with a visible light image detector whether a user is in a predetermined range by receiving a detecting wave reflected from the user as a captured image and determining whether a skin color extent of the captured image is greater than a threshold, and recording a duration during which the user is not in the predetermined range;

(b) when the duration is greater than a predetermined time, controlling the computer system to enter a lock status;

(c) when the computer system is in the lock status and the user is detected in the predetermined range, determining whether the user has an effective authority; and (d) when the user has the effective authority, controlling the computer system to enter the unlock status.

2. The method as claimed in claim 1, wherein when the skin color extent of the captured image is greater than the threshold, it is determined that the user is in the predetermined range.

3. The method as claimed in claim 1, wherein when the skin color extent of the captured image is smaller than the threshold, it is determined that that the user is outside the predetermined range.

4. The method as claimed in claim 1, wherein the detecting wave is transmitted before the step of receiving the detecting wave.

5. The method as claimed in claim 1, further comprising:

when the computer system is in the lock status and the user has the effective authority, resetting the duration to zero.

6. The method as claimed in claim 1, wherein Step (c) comprises steps of:

accessing a radio frequency identification (RFID) tag of the user; and determining whether the RFID tag is authorized.

7. The method as claimed in claim 6, wherein the user has the effective authority when it is determined that the RFID is authorized.

8. An automatic lock and automatic unlock computer system, comprising:

a visible light image detector for detecting whether a user is in a predetermined range;

an identifying module, for identifying an authority of the user; and a processing unit, coupled to the visible light image detector and the identifying module, for controlling the visible light image detector and the identifying module, and executing logic instructions for controlling the computer system to enter an unlock status or a lock status, wherein when the computer system is in the unlock status and the visible light image detector does not detect the user in the predetermined range, the processing unit records a duration; when the duration is greater than a predetermined time, the processing unit controls the computer system to enter the lock status; when the computer system is in the lock status and the visible light image detector detects the user in the predetermined range, the processing unit determines whether an authority of the user is an effective authority; and when the processing unit determines that the user has the effective authority, the processing unit controls the computer system to enter the unlock status, wherein the visible light image detector receives a detecting wave reflected from the user as a captured image, and the processing unit determines whether the user is in the predetermined range according to a skin color extent of the captured image.

9. The computer system as claimed in claim 8, wherein when the computer system is in the lock status and the user has the effective authority, the processing unit resets the present duration to zero.

10. The computer system as claimed in claim 8, wherein the identifying module accesses an RFID tag of the user, and the user has the effective authority when the processing unit determines the RFID tag is authorized.

11. The computer system as claimed in claim 8, wherein the identifying module is an RFID tag reader, a fingerprint reader or an image reader.

* * * * *